US006904106B2

(12) United States Patent
Papasakellariou et al.

(10) Patent No.: US 6,904,106 B2
(45) Date of Patent: Jun. 7, 2005

(54) METHOD AND APPARATUS FOR SPREAD SPECTRUM INTERFERENCE CANCELLATION

(75) Inventors: Aris Papasakellariou, Dallas, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 301 days.

(21) Appl. No.: 09/974,576

(22) Filed: Oct. 9, 2001

(65) Prior Publication Data

US 2003/0067968 A1 Apr. 10, 2003

(51) Int. Cl.[7] .............................................. H04L 27/06
(52) U.S. Cl. ...................... 375/341; 375/262; 714/795; 714/796
(58) Field of Search ................................ 375/341, 265, 375/262, 148, 147, 346, 144; 714/794, 795, 796; 370/335, 342; 455/296

(56) References Cited

U.S. PATENT DOCUMENTS

| 5,467,368 | A | | 11/1995 | Takeuchi et al. |
| 5,553,062 | A | | 9/1996 | Schilling et al. |
| 2002/0051433 | A1 | * | 5/2002 | Affes et al. |
| 2003/0012264 | A1 | * | 1/2003 | Papasellariou et al. |

OTHER PUBLICATIONS

Correal, Neiyer S., et al., "Real–Time DSP Implementation of a Coherent Partial Interference Cancellation Multiuser Receiver for DS–CDMA," IEEE 1998, pp. 1563–1540.
Varanasi, Mahesh K., et al., "Multistage Detection in Asynchronous Code–Division Multiple–Access Communications," IEEE Transactions on Communications, vol. 38, No. 4, Apr. 1990, pp. 509–519.
Divsalar, Dariush, et al., "Improved Parallel Interference Cancellation for CDMA," IEEE Transactions on Communications, vol. 46, No. 2, Feb. 1998, pp. 258–268.

* cited by examiner

Primary Examiner—Temesghen Ghebretinsae
(74) Attorney, Agent, or Firm—Ronald O. Neerings; Wade James Brady, III; Frederick J. Telecky, Jr.

(57) ABSTRACT

The interference cancellation (IC) system (500) includes a plurality of IC units, for which IC is applied. Each IC unit has its spread spectrum code generator, delay devices, correlators or matched filters (MF), spreading circuits and subtracting and adding devices. The IC process in accordance with the invention includes using a bank of MF to despread the received signal at every time instant corresponding to every identified multipath of every user's transmitted signal. Based on the despread signals, an initial decision for the present information symbol of every user can be made using a single-user receiver such as, for example, the conventional Rake receiver or an equalizer. Based on the initial decisions, IC regenerates the multipath signals for each user using timed versions of the spread spectrum code, the delays of the multipaths, and the corresponding channel medium estimates. By adding the regenerated signal estimates for the multipaths of all users, an estimate of the received signal at the input of the receiver prior to despreading can be reconstructed. Each IC unit despreads the regenerated received signal using timed versions of the corresponding spread spectrum code for each multipath delay. The result is subsequently subtracted from the initial despread signal and, to avoid removing the desired user path component, the reconstructed, interference-free, desired despread signal path is also added. The above IC process may be repeated several times (e.g., using several IC stages). Performing interference cancellation after despreading the regenerated estimate of the received signal leads to substantially smaller complexity than the prior art approach where the interference cancellation occurs prior to despreading.

8 Claims, 3 Drawing Sheets

METHOD AND APPARATUS FOR SPREAD SPECTRUM INTERFERENCE CANCELLATION

TECHNICAL FIELD

This invention relates in general to the field of radio communications and more specifically to a method and apparatus for spread spectrum interference cancellation.

BACKGROUND

Code Division Multiple Access (CDMA) has been extensively used in such applications as cellular and satellite communications. CDMA signals increase the spectrum required for the transmission of a particular data rate by modulating each information symbol with a spread spectrum code having a rate larger than the data rate. The same spreading code is used for each information symbol. Typically, the spreading code includes a few tens or a few hundreds elements, called chips, and is chosen from the set of orthogonal (Walsh) codes of the given code length. To decrease the correlations among spreading codes assigned to different users and thereby reduce the interference among different users, the data stream after spreading is typically scrambled with a pseudonoise (PN) code that is generated serially and cyclically and has a larger period than the spreading code. PN codes have considerably better correlation properties than orthogonal codes. Examples of such CDMA signal spreading are the schemes used by the IS-95/CDMA2000 and Wideband Code Division Multiple Access (WCDMA) systems.

With CDMA, the signals from all users simultaneously occupy the same frequency band. The receiver discriminates the multiple signals by exploiting the properties of the spreading and scrambling codes that are applied to the signal of each user. The receiver attempts to match in time with the codes of the desired signal a replica of those spreading and scrambling codes. Only then is the demodulation result meaningful; otherwise it appears noise-like. Thus, if the arriving signals have different codes or different code offsets, they can be discriminated at the receiver.

In the downlink of cellular communication systems, i.e. the communication from base stations to mobile terminals, the wireless channel may introduce multipath propagation. Even if the signals transmitted by the base station are spread using orthogonal codes (Walsh codes), the multipath propagation will destroy the orthogonality and produce Multiple-Access Interference (MAI). In the uplink (i.e., the communication from mobile terminals to base stations), the signals are asynchronously transmitted. Orthogonality in this case cannot be achieved and each user's signal will experience MAI.

Interference cancellation (IC) attempts to suppress the MAI by estimating and subtracting the contribution of each interferer from the received signal. Because the capacity of CDMA systems is MAI limited, estimating and canceling the MAI will increase the capacity. Alternatively, IC can reduce the signal-to-noise ratio (SNR) required to achieve a specific symbol-error-rate (SER) value for a specific number of users, thereby increasing battery life and decreasing transmission power or increasing the communication range.

The challenge in the implementation of IC is that it may have to be performed for many code signals (and their multipath components) at the symbol rate or faster. The associated computation and data storage requirements can place a significant burden on the overall receiver design, not to mention the increase in design cost.

The prevailing considerations governing the implementation of IC are complexity and performance with the former being the dominant consideration. One prior art implementation is to perform IC by regenerating the MAI based on a tentative decision for each user, the channel medium estimates and delays of the associated multipaths, and the spreading and scrambling codes. The regenerated MAI is then subtracted from the received signal before despreading. Another prior art approach that avoids signal regeneration is based on the computation of the code cross-correlations among all signals and multipaths. The effect of MAI on the despread signal can then be evaluated and removed. For K users and L multipaths per user's transmitted signal, this approach results in complexity proportional to $(KL)^2$ while the approach based on signal respreading can have complexity proportional to (KL) as it will be later discussed. Both approaches offer theoretically the same performance.

In addition to IC, MAI suppression can be achieved using linear Multiuser Detection (MUD) methods such as the decorrelating and the Minimum-Mean-Squared Error (MMSE) detectors. With the exception of IC using signal regeneration, all other approaches require knowledge of the code cross-correlations for all signal multipaths of all users. In the case of a long scrambling code having a considerably larger period than the data symbol period (e.g. by a factor of 1000 or more), the code cross-correlations computations need to be performed every symbol period. The total number of code cross-correlations is proportional to the square of the product of the number of interferers and the number of multipaths $(KL)^2$. The decorrelating and MMSE detectors need to invert a code cross-correlation matrix with size proportional to the product of the observation window size, the number of users and the number of multipaths per user's signal. Because matrix inversion has cubic complexity relative to the matrix size, the decorrelating and MMSE detectors are not practical choices in CDMA systems employing long codes. IC based on code cross-correlation computations suffers from similar complexity drawbacks because it requires an equal number of code cross-correlation computations as the decorrelating and MMSE detectors. It also needs to perform the same number of interference subtractions as the computed code cross-correlations. Performing these computations at the symbol rate will substantially increase the corresponding receiver complexity relative to the complexity of a receiver that does not perform multi-user detection or IC.

A CDMA system employing short scrambling codes with a period a few times larger than the symbol period, e.g. 8 times, can alleviate the computational requirements of MUD/IC. This is because the code cross-correlations have the same values after every scrambling code period and have to be recomputed only when there is a change in the MAI such as a user signal or multipath being added or deleted, an existing multipath changing its arrival time, etc. Those changes occur at a rate that is much slower than the symbol rate. Nevertheless, the complexity order is still comparable with the one described for long codes, with the only exception that computations related to the evaluation of code cross-correlations are performed at a slower rate.

The implementation alternatives for IC are the Parallel IC (PIC) and the Serial IC (SIC). With PIC, all users are simultaneously demodulated, a tentative decision is made for their information symbols, the MAI is regenerated and the process is repeated a number of times until all significant improvements in the Frame-Error-Rate (FER) performance are achieved. With SIC, a similar process is performed with the exception that a decision on the stronger user is first made, the interference from that user on the decision statistic of the next stronger user is subsequently removed and a decision for the next stronger user is made, etc.

The main advantage of SIC relative to PIC is that the decision for the stronger users is more reliable than the decision for the weaker ones and therefore, the MAI removal of the stronger users is reliable and this benefits the weaker users. The main disadvantage of SIC relative to PIC is the decision delay associated with SIC because of its serial nature and the architecturally difficult re-ordering of the detection process each time the relative signal strengths change. There are also several modifications that can be applied to the IC process. For example, the decisions made at each IC stage can be hard, soft, clipped or threshold-based, the estimated IC can be weighted to account for the bias that exists in the decisions and for the reliability of the individual decisions depending on the IC stage.

The complexity of PIC can be made linear with the number of users and multipaths by using PIC with signal regeneration as suggested in an article entitled "Real-Time DSP Implementation of a Coherent Partial Interference Cancellation Multiuser Receiver for DS-CDMA", pages 1536–1540, ICC 1998, by N. S. Correal, et al. Each user has its multipath signals regenerated, time adjusted by their corresponding delays, and then added to construct the estimated MAI before despreading. Since this MAI estimate contains all signals subtracting it from the received signal will also cancel the contribution of the desired user's multipath component and therefore the estimated desired user's multipath component should also be added. The estimated MAI term is common for all users and only the desired user's estimated multipath contribution needs to be individually added for each multipath. This is the reason for the complexity reduction from quadratic to linear with the number of users and multipaths. By subtracting the estimated MAI from the received signal, despreading and then adding the estimated desired signal path to effectively remove its presence from the estimated MAI, all signals interfering with the desired signal path are eliminated from the detection of the desired signal. This assumes that the estimated MAI is correct which in turn requires a correct tentative data decision and accurate channel medium and delay estimates. The exemplary embodiment of this invention considers PIC.

The exemplary setup in FIG. 1 describes a conventional receiver (Rake receiver), as it is well known in the art, for K users with L multipaths per user's signal. It includes a plurality of despreading means, a plurality of timing means, a plurality of spread spectrum processing means, and a plurality of adding means. The signal, which is the superposition of KL signal paths and noise, is received at antenna 10 and is subsequently downconverted and digitized by a down converter 20 and an analog-to-digital (A/D) converter 30 respectively. The searcher 40 identifies L or more paths for each of the K users. Subsequently, L paths for each user's signal are passed to despreaders 51, 52, etc. Notice that L is generally different for each user. Each despreader (or finger) uses a replica of the spread spectrum code of the particular user's code that is appropriately delayed in time to synchronize with the corresponding multipath. The $l^{th}$ despreader output for the $l^{th}$ path of the $k^{th}$ user is denoted as $D_{k,l}$.

The plurality of despreaders is shown as $1^{st}$ despreader through $K^{th}$ despreader. Each despreader includes a chip-code signal generator, a modulo-2 adder and a summer (not shown). In addition to the despread signal paths, the despreader (possibly together with another unit) also provides a channel medium estimate for all multipaths of each user's signal ($C_{k,1}, \ldots, C_{k,L}$ for user k). The channel medium estimates are needed by the conventional receiver to combine the multipaths and by the IC to regenerate the despread signals. After despreading, the multipath signals for each user and the corresponding channel medium estimates are provided to decision devices, 61, 62, which in the exemplary embodiment comprises a Rake receiver. The Rake receiver performs maximal ratio combining (MRC) on the multipaths of each user's signal and provides a decision $d^o{}_1$ 63, $d^o{}_K$ 64 for the corresponding information symbol. The decision can be either hard or soft and, for the purposes of IC, it can be either clipped (the soft value is clipped at −1 and +1 for binary transmission) or thresholded (e.g., similar to the clipped one but the soft decision is set to zero if its absolute value is smaller than a threshold). For a receiver employing IC, the Rake decisions constitute the initial decisions and are subsequently provided to the IC system. In an alternate design, the initial decisions can be made with an equalizer circuit.

FIG. 2 describes the regeneration process of the signal at the input of the receiver after digitization. Based on the (possibly modified) decisions from the Rake receiver of each user (or another receiver such as a MUD or an equalizer), the IC system first regenerates in the plurality of respread channel blocks 71, 72 the signal from each transmitter by spreading the decision 63, 64 for each user with the corresponding spread spectrum chip code (CDMA code). Different users may have different spread spectrum chip codes. Subsequently, to account for the channel medium effects on each user's multipath signals, the respread signal is multiplied with the channel medium estimate for each multipath using blocks 81–84 and time delayed by the corresponding multipath delay using delay blocks 91–94. Adder 100 sums all multipaths for the signals of all users and the result 102 is an estimate of the signal at the input of the receiver before despreading.

Since the regenerated received signal contains the received signal for each user, its subtraction from the originally received signal will not only remove the interference relative to a desired user but it will also remove the signal of that user. Therefore, for the demodulation of a particular user's signal, the estimated signal for that user (including the multipaths) should be added to the received signal estimate that is commonly utilized by all users. This can be done prior to, or after, despreading with the second option being the more efficient one since it requires substantially less operations. The estimated signal of each user, including possible multipaths, after despreading is simply given by the estimated information data multiplied with the channel medium response estimate for each multipath. FIG. 3 describes these corresponding operations using devices 111–114 one for each of the multpaths.

The conventional (prior art) approach to perform IC is to subtract the estimated regenerated signal from the received signal before despreading. This IC approach is depicted in FIG. 4. In subtractor 120, the regenerated signal estimate 102 is subtracted from the received signal 101. Conventional despreading for each identified multipath of each user follows in the plurality of finger blocks 131–134. The desired user multipath component for each multipath is added in the plurality of adder blocks 141–144. Finally, in the plurality of Rake combiner blocks 151, 152, the multipaths are combined by a Rake combiner and a decision signal 153, 154 for the information symbol of each user is produced. The IC process is then repeated several times (IC stages) and typically 3 or 4 IC stages are enough to achieve essentially all performance gains. The regenerated signal at each stage may be weighted (scaled) with different weights having values smaller than or equal to one. This is done in order to remove a decision bias and to reflect that the decisions at the latter IC stages are more reliable. This approach was suggested in U.S. Pat. No. 5,553,062 entitled "Spread Spectrum CDMA Interference Canceller System and Method", by D. L. Schilling, et. al.

For the $k^{th}$ user, denoting by $w_k$, $c_{k,l}$, and $d_k$, the spread spectrum code, the channel estimate of the $l^{th}$ path and the data decision, respectively, the equation describing the despread signal $$D_{k,l}^{(i)}$$

at the $i^{th}$ IC stage (i>0) is $$D_{k,l}^{(i)} = w_k^T \left[ \underline{r} - \left( \sum_{k',l'} w_{k'} c_{k',l'} d_{k'}^{(i-1)} \right) \right] + \underline{c}_{k,l} d_k^{(i-1)}. \quad (1)$$

A problem with the IC approach used in FIG. 4 is its computational complexity. The memory size required with the above approach is proportional to $N_s N_c$, where $N_c$ is the number of chips per information signal and $N_s$ is the number of samples per chip, and therefore a large amount of memory is required. A need thus exist in the art for a method and apparatus that can provide IC with reduced complexity and reduced memory requirements as compared to the prior art IC techniques.

SUMMARY OF THE INVENTION

The present invention describes a reduced complexity spread spectrum code division multiple access (CDMA) interference canceller (IC) implementation to suppress multiple access interference (MAI) in a CDMA communication system.

Each of the communication signals is spread spectrum processed by a spread spectrum code. This spread spectrum code may be a pseudo-random (PN), an orthogonal code (Walsh code) or, as in the proposed third generation CDMA-based cellular systems, a code resulting by superimposing a Walsh and a PN code (CDMA code). The uniqueness of the code may be based on different spreading codes or on delayed versions of the same CDMA code.

The interference canceller at the receiver includes a MAI regeneration unit and multiple IC units. The MAI regeneration unit utilizes initial decisions made by a receiver to reconstruct the MAI. The receiver making the initial decisions may be a single-user receiver (typically a Rake receiver) or a more complex receiver structure, such as MUD or an equalizer. Using the initial decisions for all users and the corresponding spread spectrum codes, the MAI regeneration unit first performs a function analogous to that of the transmitters and generates the estimated transmitted signal for each user. This signal simply comprises of the corresponding spread spectrum CDMA code modulated by the estimated information symbol. The regenerated transmitted signals have the same time reference. The effects of the channel medium are then mapped on the regenerated transmitted signals. The regenerated signal for each user is delayed by a time period corresponding to each corresponding multipath and multiplied with the channel medium estimate for the particular multipath. The delay and channel medium information for each multipath are typically obtained as a byproduct of the signal detection process (e.g.

a Rake receiver is already provided with delay and channel medium estimates for each multipath) and do not add on the overall IC complexity. Once the multipath signals corresponding to each user are reconstructed, they are added to represent the received signal corresponding to the particular user. Once the received signals for all users are reconstructed, they are added to represent the received signal from the plurality of users which is an estimate of the signal observed at the input of the receiver. The regenerated signal is then despread at the time instant of each identified multipath and the result is subtracted from the received despread signal for the corresponding multipath. Because the despread regenerated signal includes the multipath component of a particular path, the estimated despread signal for that particular path is also added after the despread regenerated signal is subtracted. Subsequently, new decisions are made and the previous process may be iterated several times.

BRIEF DESCRIPTION OF THE DRAWINGS

The features of the present invention, which are believed to be novel, are set forth with particularity in the appended claims. The invention, may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
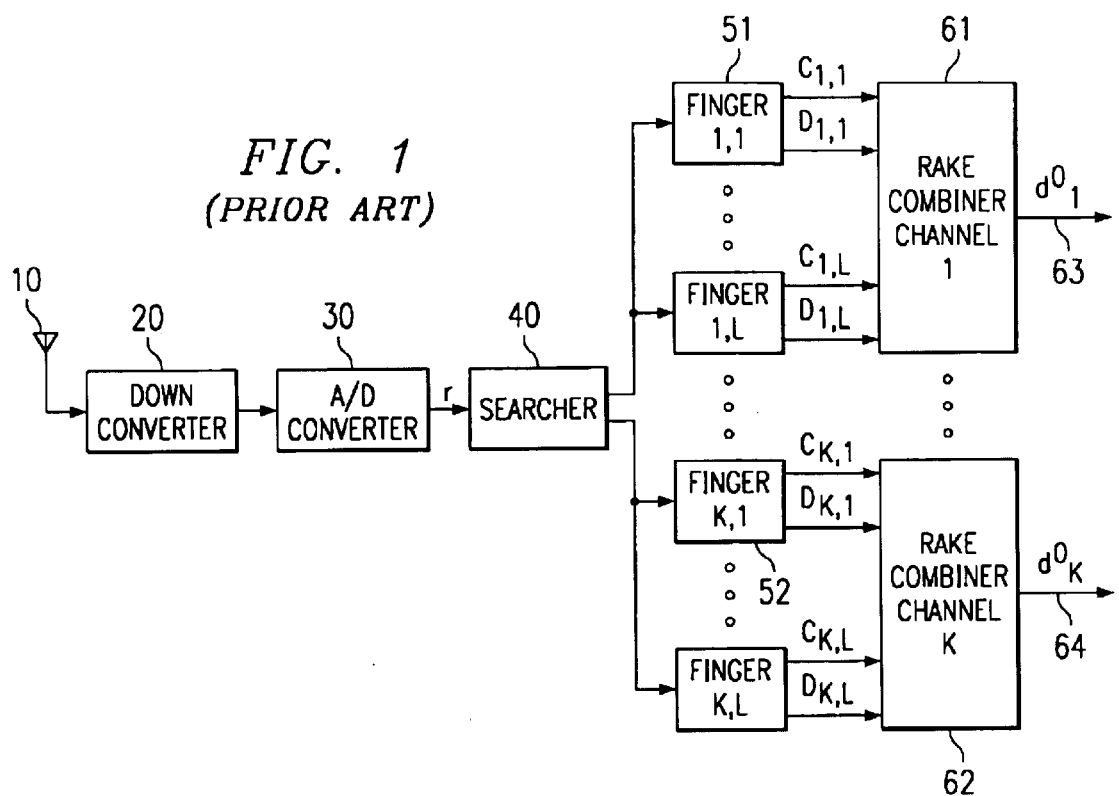
FIG. 1 is a block diagram of a prior art spread spectrum CDMA Rake receiver.
Figure 2:
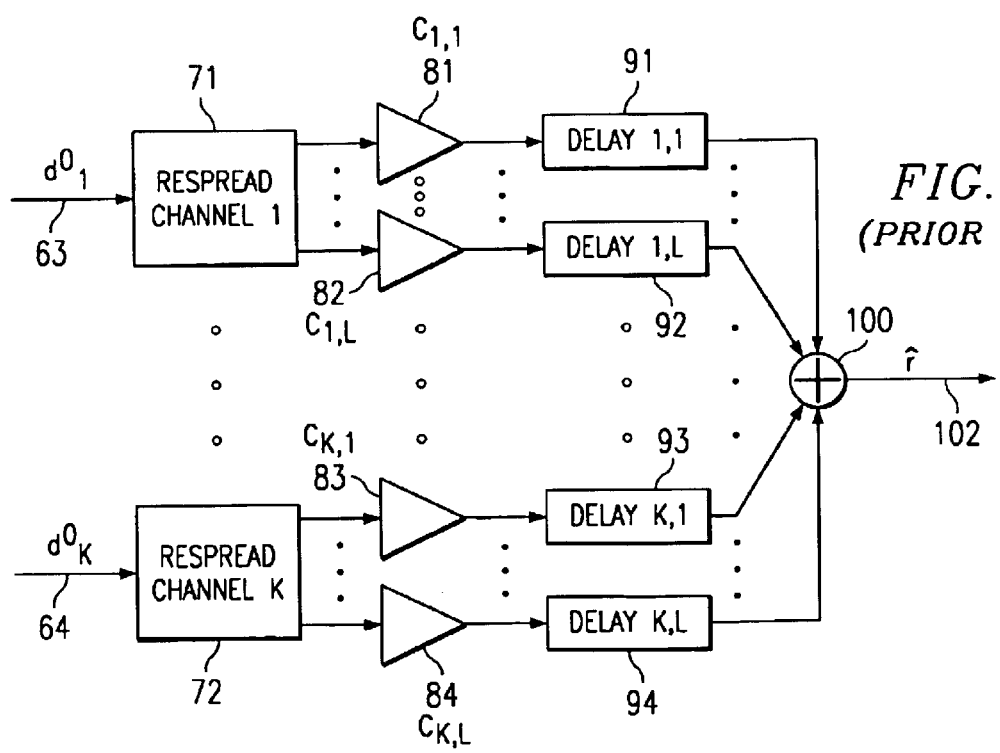
FIG. 2 is a block diagram for the received signal regeneration before despreading which is employed by the spread spectrum CDMA interference canceller of the invention and the prior art.
Figure 3:
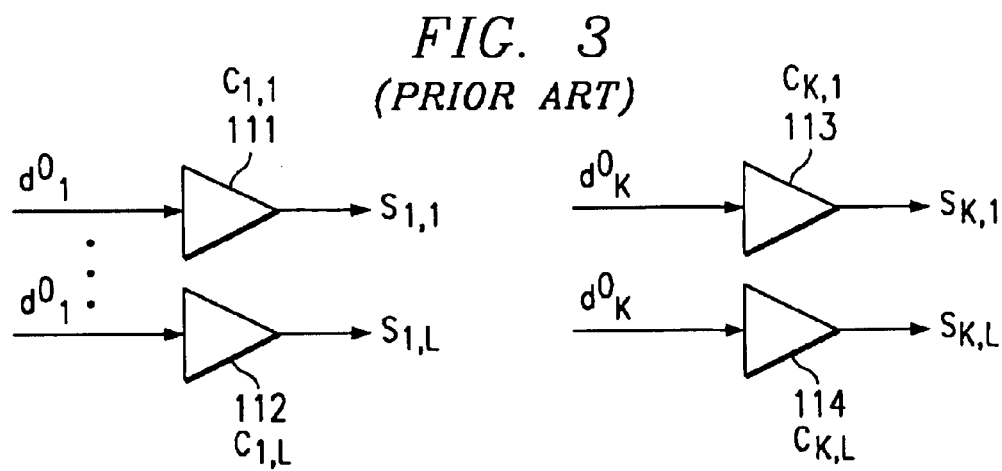
FIG. 3 is a block diagram for the regeneration of the signal components corresponding to the communication signals paths after despreading which is employed by the spread spectrum CDMA interference canceller of the invention and the prior art.

While the specification concludes with claims defining the features of the invention that are regarded as novel, it is believed that the invention will be better understood from a consideration of the following description in conjunction with the drawing figures.

The following description can apply to both the base station and the mobile station of a spread spectrum code division multiple access (CDMA) communication system. A system with K users and L multipaths per user's signal is assumed. Also, although the discussion will use the same number of multipaths for each user's signal, the number of multipaths for each can be different for each user's signal but this does not affect the applicability of the disclosed invention while it makes its description clearer.

Figure 5:
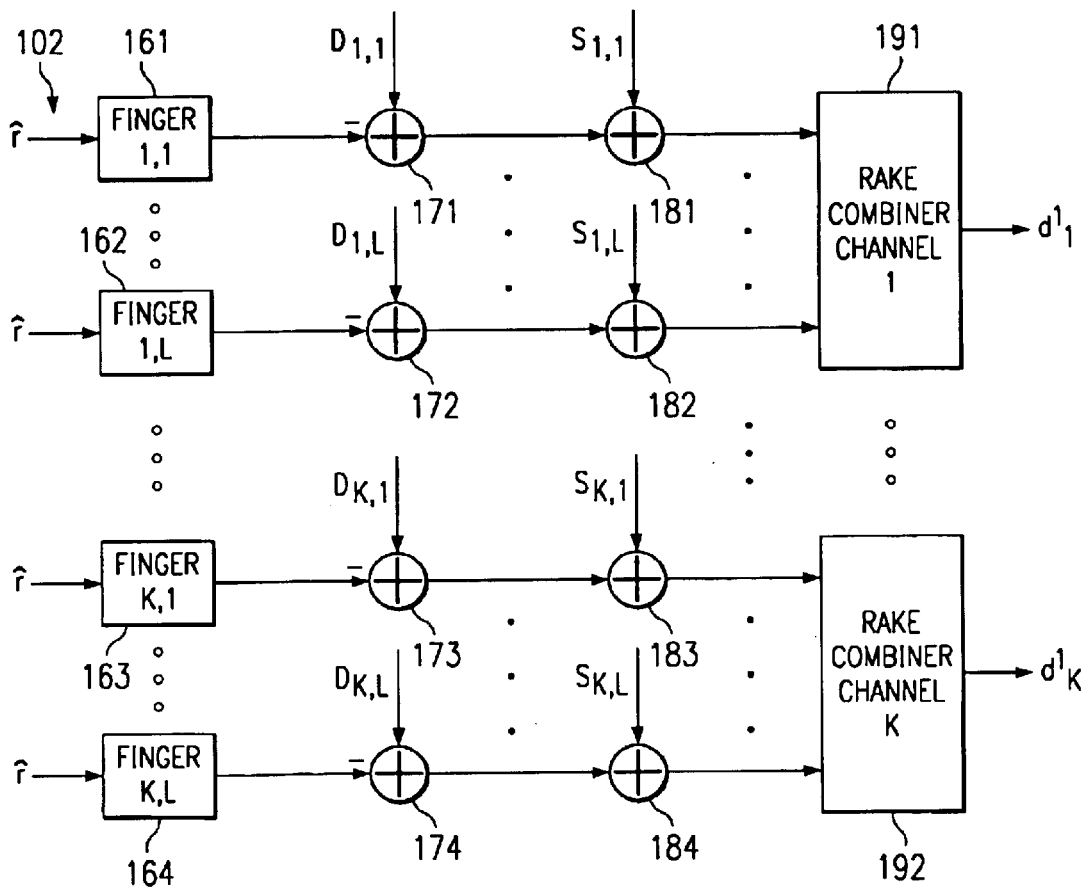
FIG. 5 is a block diagram describing the architecture for the interference canceller of the disclosed invention, according to one embodiment of the invention.

The proposed IC approach in accordance with the present invention is described in FIG. 5. According to the invention, the regenerated estimated signal 102 is first despread in the IC block 500 by a plurality of blocks (fingers) 161–164 for each user using the spread spectrum code of that user at the appropriate time instant defined by the estimated delay of each multipath for that user. The subtraction of the estimated interference from each multipath of each user is performed after despreading in the plurality of blocks 171–174. The estimated multipath component for the desired user is subsequently added in the plurality of blocks 181–184. Clearly, the order of blocks 171–174 and 181–184 in IC block 500 of FIG. 5 can be reversed without affecting the invention. Finally, the multipaths of each user are combined in a plurality of decision circuits such as Rake receiver combiner blocks 191–192 and tentative decisions are made regarding the information symbol of each user's signal. In an alternate design, the decisions can be made with an equalizer circuit. Using the same notation as in Equation (1), the equation describing the despread signal for the $l^{th}$ path of the $k^{th}$ user with the proposed IC at the $i^{th}$ stage (i>0) is $$D_{k,l}^{(i)} = D_{k,l}^{(0)} - w_k^T \left( \sum_{k',l'} w_{k'} c_{k',l'} d_{k'}^{(i-1)} \right) + \underline{c}_{k,l} d_k^{(i-1)}. \qquad (2)$$

Figure 4:
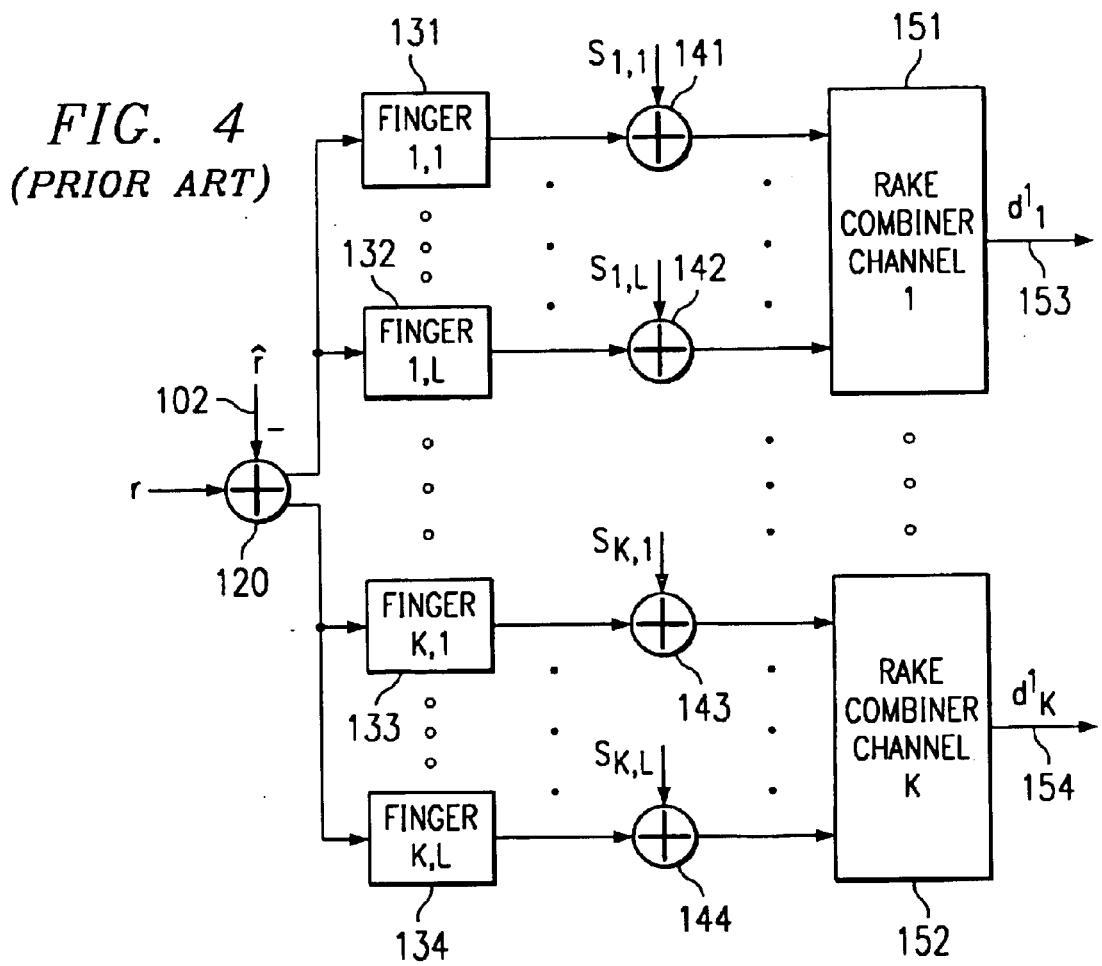
FIG. 4 is a block diagram describing the architecture for the interference canceller of the prior art.

The difference in the order of operations of Equations (1) and (2) is the same as the one reflected in FIGS. 4 and 5. Equation (1) and FIG. 4 describe the prior art while Equation (2) and FIG. 5 describe the disclosed invention.

The IC process can be repeated several times (several IC stages) until all performance benefits of performing repetitive ICs are exhausted. Typically, this will be up to three or four repetitions. In fact, as suggested by the corresponding equations, the prior art IC method has identical performance with that of the IC method described in the disclosed invention.

Comparing to FIG. 4 which describes the established prior art approach of performing IC, the approach in FIG. 5 that is proposed in this invention involves KL more adders but the corresponding additions are performed after despreading. Assuming $N_s$ samples per chip and $N_c$ chips per information symbol, the rate at which additions are performed is reduced by $N_s N_c$. The number of additions for subtracting the interference before despreading is $N_s N_c$ while the number of additions for subtracting the interference after despreading is KL. Typically, for a CDMA communications system operating at or below capacity, $KL < N_s N_c$. Therefore, for a system operating at capacity, the number of additions with the IC approach proposed in this invention is smaller than the number of additions with the established IC approach. Also, the corresponding additions are performed at a much lower rate. The proposed IC method has considerably reduced computational complexity relative to the computational complexity of the IC method considered in prior art. This reduction is even larger for communication systems operating below capacity.

The memory size for storing the received signal with the established approach is proportional to $N_s N_c$, while with the approach proposed in this invention the memory size is proportional to KL. The size (number of bits representing the signal) of the received data stored after despreading is larger than the size of the received data stored before despreading by a factor of 1.5–2 depending on the value of $N_c$. Because the IC performance degrades rapidly for time errors above $T_c/10$, where $T_c$ is the chip duration, typical values of $N_s$ for systems performing IC are $N_s=8$ and $N_s=16$.

At capacity, the memory size required by the IC approach in this invention is about four to twelve times smaller than the memory size required with the prior art IC approach. The same is true about the reduction in the number of additions associated with interference subtraction. The IC device and method described herein substantially reduce implementation complexity thereby reducing cost, while retaining all features of interference cancellation.

Several other modifications for the proposed IC method and architecture may be devised by those skilled in the art.

What is claimed is:

1. A method of interference cancellation (IC) for a spread-spectrum code division multiple access (CDMA) receiver operating in a CDMA system having a plurality of users each employing a CDMA code, the receiver comprising the steps of
   (a) despreading a received spread spectrum signal for each path and for each CDMA code;
   (b) performing a decision for an information symbol carried in the spread spectrum signal for each CDMA code;
   (c) obtaining an estimate of the channel medium for each path of each CDMA code;
   (d) using the information symbol decision for each CDMA code, the channel medium estimate and time instant for each path, and the CDMA codes to provide a regenerated spread spectrum signal estimate by regenerating and summing the received signals for each CDMA code and each signal path;
   (e) using the information symbol decision for each CDMA code and the channel medium estimate for each signal path to provide an interference-free estimate for each despread signal path of each CDMA code;
   (f) despreading the regenerated signal estimate at every time instant corresponding to all identified paths signals for every CDMA code;
   (g) subtracting the despread regenerated signal estimate from the despread received signal for each paths arid for each CDMA code;
   (h) adding each interference-free estimate of the output of the subtracting to the despread signal path for each path and for each CDMA code; and
   (i) performing a decision for the information symbol carried in the spread spectrum signal for each CDMA code.

2. A method as defined in claim 1, further comprising repeating steps (d) to (i) at least one more time.

3. A method as defined in claim 1, wherein the despread signal estimates in steps (e) and (f) are scaled by a weighting factor.

4. A method defined in claim 1, wherein the decisions in step (b) or (i) are made with a Rake receiver.

5. A method defined in claim 1, wherein the decisions in step (b) are made with an equalizer.

6. An interference cancellation circuit for use in a spread spectrum code division multiple access (CDMA) receiver, the interference cancellation circuit comprising:
   a first despreader circuit for despreading a received spread spectrum signal;
   a first decision circuit coupled to the despreader for performing a decision for an information symbol carried in the spread spectrum signal for each CDMA code;
   a channel estimation circuit coupled to the despreader circuit for obtaining an estimate of the channel medium for each path of the received spread spectrum signal;
   a regeneration circuit coupled to the decision circuit and channel estimation circuit for providing a regenerated spread spectrum signal estimate by regenerating and summing the received signals for each CDMA code and each signal path;

a multiplier coupled to the decision circuit and channel estimation unit, for providing an interference-free estimate for each despread signal path of each CDMA code;

a second despreader circuit coupled to the regeneration circuit, for despreading the regenerated signal estimate at every time instant corresponding to all identified signal paths for every CDMA code;

a subtractor coupled to the first and second despreader circuits for subtracting the despread regenerated signal estimate from the despread signal for each of the signal paths and for each of the CDMA codes;

an adder coupled to the subtractor for adding the estimate of the interference-free despread signal path to the output of the subtractor for the same despread signal path and for each CDMA code; and a second decision circuit coupled to the adder for performing a decision for the information signal carried in the spread spectrum signal for each CDMA code.

7. The interference cancellation circuit of claim 6, wherein the first decision circuit comprises an equalizer or Rake receiver.

8. The interference cancellation circuit of claim 7, wherein the second decision circuit comprises a Rake receiver.

* * * * *